US012260803B2

(12) United States Patent
Won et al.

(10) Patent No.: US 12,260,803 B2
(45) Date of Patent: Mar. 25, 2025

(54) DATA DRIVING DEVICE

(71) Applicant: LX SEMICON CO., LTD., Daejeon (KR)

(72) Inventors: Da Sol Won, Daejeon (KR); Kwang Myung Kang, Daejeon (KR); Yong Min Kim, Daejeon (KR); Dong Keun Song, Daejeon (KR); Jung Min Choi, Daejeon (KR); Seon Ho Hong, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/512,345

(22) Filed: Nov. 17, 2023

(65) Prior Publication Data

US 2024/0105099 A1 Mar. 28, 2024

(30) Foreign Application Priority Data

Sep. 27, 2022 (KR) ........................ 10-2022-0122510

(51) Int. Cl.
*G09G 3/20* (2006.01)
*G09G 3/00* (2006.01)

(52) U.S. Cl.
CPC .......... *G09G 3/2092* (2013.01); *G09G 3/007* (2013.01); *G09G 2310/027* (2013.01); *G09G 2310/0291* (2013.01)

(58) Field of Classification Search
CPC .......... G09G 2310/027; G09G 3/3614; G09G 2310/0297; G09G 2310/0291; G09G 3/3685; G09G 2320/0233; G09G 2300/0828; G09G 3/3696; G09G 2320/0276; G09G 2310/0275; G09G 2360/16; G09G 3/3275; G09G 3/3291; G09G 2300/0871; G09G 2300/0838; H03F 3/3028; H03F 3/45192; H03F 3/45219; H03F 3/45273; H10K 59/00-95; H10K 59/35; H03M 1/66
See application file for complete search history.

(56) References Cited

U.S. PATENT DOCUMENTS

2011/0050680 A1* 3/2011 Chung ................ G09G 3/3688 345/100

FOREIGN PATENT DOCUMENTS

JP 2011525640 A * 9/2011

* cited by examiner

*Primary Examiner* — Sanjiv D. Patel
(74) *Attorney, Agent, or Firm* — ROTHWELL, FIGG, ERNST & MANBECK, P.C.

(57) ABSTRACT

The embodiment relates to a data driving device for driving pixels of a display panel. In the data driving device, two adjacent DACs can have different gate loads for the same gray level value so that the fluctuation of the gate load according to the gray level value is reduced.

18 Claims, 9 Drawing Sheets

DATA DRIVING DEVICE

CROSS-REFERENCE TO RELATED APPLICATIONS

The present application claims the benefits of priority to Korean Patent Application No. 10-2022-0122510, filed on Sep. 27, 2022 in the Republic of Korea, the entire contents of which are hereby expressly incorporated by reference into the present application

BACKGROUND OF THE DISCLOSURE

Field

The embodiment relates to a data driving device for driving pixels of a display panel.

Discussion of the Related Art

A display panel comprises a plurality of pixels. The brightness of each of pixels is adjusted using a backlight and liquid crystal, and the brightness is adjusted by adjusting the amount of power flowing to a self-light-emitting device such as an organic light emitting diode (OLED).

Meanwhile, the display device comprises a display panel having a plurality of pixels and a driving device that can adjust the brightness of each pixel. The driving device adjust the brightness of each pixel by adjusting the degree of opening and closing of the liquid crystal or by adjusting the amount of power supplied to the self-light-emitting device.

The driving device supplies a data voltage corresponding to the grayscale value of each pixel to each pixel. Each pixel can adjust the degree of opening and closing of the liquid crystal according to the data voltage or the amount of power supplied to the self-light-emitting device. In terms of supplying data voltage, the driving device is also called a data driving device. Meanwhile, a driving transistor is disposed in each pixel. In terms of supplying data voltage to the source terminal of the driving transistor, the data driving device is also called a source driver. In addition, the data driving device is also called a column driver because one channel drives a plurality of pixels forming one vertical line.

The data driving device drives one line per horizontal line at predetermined horizontal times. For example, the data driving device drives the pixels of the first horizontal line during the first horizontal time and drives the pixels of the second horizontal line during the second horizontal time following the first horizontal time.

The data driving device changes the magnitude of the data voltage supplied to the display panel according to the grayscale value of each line pixel at one point in each horizontal time. For example, the data driving device supplies the first data voltage to the display panel during the first horizontal time, and then changes the first data voltage to the second data voltage at the start of the second horizontal time to supply the second data voltage to the display panel.

The data driving device can receive image data from the data processing device. The image data can comprise pixel data representing the grayscale value of each pixel. The data driving device can convert pixel data into analog voltage and amplify the analog voltage to generate a data voltage. Since the pixel data is transmitted in the form of digital signals, the data driving device can comprise a plurality of digital to analog converters (DACs) that convert digital signals into analog voltages.

Each DAC can convert a digital signal into an analog voltage using a plurality of switches. The load that consumes the most power in the DAC can be the gate load of each switch. The amount of power consumed to drive the gate of each switch is called the gate load. The gate load can increase significantly as each switch changes states. For example, when the state of each switch changes from OFF to ON or from ON to OFF, the gate load can increase.

The size of the gate load of each DAC can vary depending on the grayscale value. For example, each DAC can have the smallest gate load when converting a digital signal with the lowest grayscale value into an analog voltage. Each DAC can have the largest gate load when converting a digital signal with the highest grayscale value into an analog voltage.

Meanwhile, a plurality of DACs can operate simultaneously to drive one horizontal line. When all DACs convert a digital signal with the highest grayscale value into an analog voltage, the gate load of the DACs can momentarily increase significantly. In reality, since one horizontal line often has the same grayscale value, this phenomenon can occur frequently. A phenomenon in which power consumption increases or decreases significantly not only increases the burden on the power source, but also generates a large amount of electromagnetic waves or noise, which can cause problems that deteriorate the image quality of the display panel.

SUMMARY OF THE DISCLOSURE

The object of the embodiment is to provide a technique for reducing the peak current of DACs. Another object of the embodiment is to provide a technique for mitigating current fluctuations in DACs. Another object of the embodiment is to provide technology to minimize electromagnetic waves or noise generation by DACs.

According to one aspect of the embodiment to achieve the above or other purposes, a data driving device, comprising: a first channel circuit comprising a first digital to analog converter (DAC) configured to perform digital-to-analog conversion using a plurality of first switches, and configured to drive a first pixel with a first data voltage that amplifies the output of the first DAC; and a second channel circuit configured to perform digital-analog conversion using a plurality of second switches and drive a second pixel with a second data voltage that amplifies the output of a second digital to analog converter (DAC), wherein in the second DAC, the plurality of second switches are disposed so that the number of the plurality of second switches turned on for one digital signal corresponding to one grayscale value is different from the number of the plurality of first switches turned on in the first DAC.

According to another aspect of the embodiment, a data driving device, comprising: a first DAC and a second DAC having different gate loads for the first and second digital signals having the same grayscale value; a first buffer configured to amplify an output of the first DAC and supplies the amplified output to a first data line connected to a first pixel; and a second buffer configured to amplify an output of the second DAC and supplies the amplified output to a second data line connected to a second pixel.

According to another aspect of the embodiment, a data driving device, comprising: a P-DAC configured to convert digital signals for driving pixels into analog voltages with positive polarity; and an N-DAC configured to convert the digital signals for driving the pixels into analog voltages with negative polarity, wherein the P-DAC and the N-DAC have different gate loads for the first digital signal and the second digital signal having the same grayscale value.

As described above, according to the embodiment, the peak current of DACs can be reduced and the current fluctuations in DACs can be alleviated. According to the embodiment, the image quality of the display panel can be improved by minimizing the generation of electromagnetic waves or noise caused by DACs.

DETAILED DESCRIPTION OF EMBODIMENTS

Figure 1:
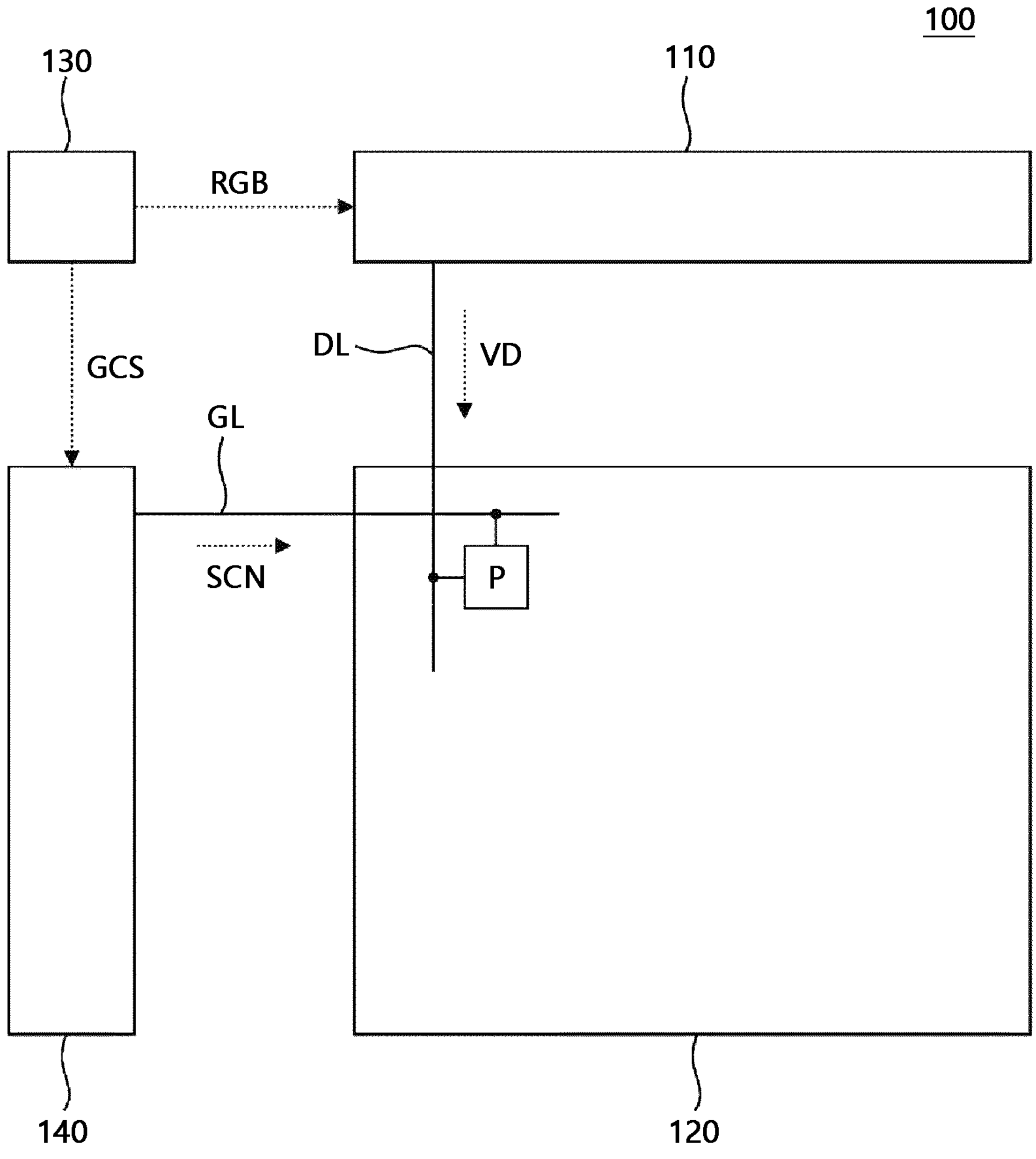
FIG. 1 is a configuration diagram of a display device according to an embodiment.

FIG. 1 is a configuration diagram of a display device according to an embodiment.

Referring to FIG. 1, the display device 100 can comprise a display panel 120, a data processing device 130, a gate driving device 140, a data driving device 110, etc.

The display panel 120 can be an LCD panel or a self-light-emitting panel such as an OLED panel.

When the display panel 120 is an LCD panel, the display panel 120 can comprise a backlight, liquid crystal, and a common electrode. Each pixel P can comprise a pixel electrode and a driving transistor. When a scan signal is supplied to the gate terminal of the driving transistor, the driving transistor is turned on and a data voltage can be supplied to the pixel electrode. Depending on the data voltage, the alignment direction of the liquid crystal can change as an electric field is formed between the pixel electrode and the common electrode. Accordingly, the brightness of the pixel P can be adjusted by changing the degree of transmission of light supplied from the backlight.

A plurality of data lines DL and a plurality of gate lines GL can be arranged in a matrix form on the display panel 120. The data line DL can be connected to the source terminal of the driving transistor of each pixel P, and the gate line GL can be connected to the gate terminal of the driving transistor of each pixel P. When the scan signal SCN is supplied to the gate line GL, the driving transistor is turned on and the data voltage VD supplied through the data line DL can be transmitted to the pixel electrode.

A parasitic capacitor can be formed in the data line DL. The parasitic capacitor can be formed between the data line DL and the common electrode or between the data line DL and the pixel electrode. From the perspective of the data driving device 110 that supplies the data voltage VD, the parasitic capacitor can be recognized as a load. The larger the capacity of the parasitic capacitor, the more power the data driving device 110 must supply to the data line DL, which can increase power consumption.

The display panel 120 can be a self-light-emitting panel such as an OLED panel. In addition to the OLED panel, self-light-emitting panels can also use other types of self-light-emitting devices such as micro-LED panels.

Each pixel P of the OLED panel can comprise a scan transistor, a driving transistor, an OLED, etc. When a scan signal SCN is supplied to the gate of the scan transistor, the scan transistor is turned on and the data voltage VD can be supplied to the driving transistor through the scan transistor. In the OLED panel, the data voltage VD can be supplied to the gate terminal of the driving transistor. The magnitude of the conduction current of the driving transistor can be determined depending on the magnitude of the data voltage VD, and the brightness of the OLED connected to the driving transistor can be adjusted depending on the magnitude of the conduction current of the driving transistor.

A plurality of data lines DL and a plurality of gate lines GL can be arranged in a matrix form on the display panel 120. The data line DL can be connected to the source terminal of the scan transistor of each pixel P, and the gate line GL can be connected to the gate terminal of the source transistor of each pixel P. When the scan signal SCN is supplied to the gate line GL, the scan transistor is turned on and the data voltage VD supplied through the data line DL can be transmitted to the driving transistor.

A parasitic capacitor can be formed in the data line DL. The parasitic capacitor can be formed between the data line DL and the cathode electrode of the OLED panel or between the data line DL and the anode electrode of the OLED panel. From the perspective of the data driving device 110 that supplies the data voltage VD, the parasitic capacitor can be recognized as a load. The larger the capacity of the parasitic capacitor, the more power the data driving device 110 must supply to the data line.

The data processing device 130 can receive image data from an external device—for example, a host or a device called an application processor (AP). The data processing device 130 can convert image data in the format of an external device into image data RGB in a format that the data drive device 110 can process. The data processing device 130 can transmit converted image data RGB to the data driving device 110.

Image data RGB can comprise pixel data representing grayscale values for the plurality of pixels P, respectively. The pixel data for one pixel P has, for example, 8 bits and can express grayscale values from 0 to 255. The data processing device 130 can generate pixel data for each pixel P, comprise the pixel data in image data RGB, and transmit the image data RGB to the data driving device 110.

The data processing device 130 can transmit a control signal to devices involved in driving the display panel 120—for example, the data driving device 110 and the gate driving device 140. The data processing device 130 can transmit a data control signal to the data driving device 110 and a gate control signal GCS to the gate driving device 140.

Control signals GCS can comprise setting information for each device. For example, the data processing device 130 can receive setting information from an external device, check the setting information for each device, and then transmit the setting information by including the setting information in the corresponding control signal GCS.

The control signals GCS can comprise timing signals for controlling each device 110 and 140. The timing signal can comprise, for example, a vertical synchronization signal, a horizontal synchronization signal, etc. The data driving device 110 or the gate driving device 140 can distinguish frames and each horizontal time according to the timing signal. In terms of controlling the timing of each device 110 and 140, the data processing device 130 is also called a timing controller.

The gate driving device 140 can supply a scan signal SCN to the pixels P of the display panel 120. The pixels P to which a scan signal SCN for turn-on is supplied can be selected, and the data voltage VD can be supplied to the selected pixels P.

The gate driving device 140 can supply a scan signal SCN through the gate line GL. A plurality of gate lines GL can be disposed on the display panel 120. Each gate line GL can be connected to pixels P arranged in a row in one direction (e.g., horizontal direction). The gate driving device 140 can supply a scan signal SCN for turn-on to one of the plurality of gate lines GL, so that the pixels P connected to the gate line GL can be selected. The gate driving device 140 can supply a scan signal SCN for turn-on while changing the gate line GL at every horizontal time.

The data driving device 110 can drive the pixels P of the display panel 120.

The data driving device 110 can receive image data RGB from the data processing device 130. The data driving device 110 can check the pixel data for each pixel P comprised in the image data RGB, generate a data voltage VD corresponding to the pixel data, and supply the data voltage VD corresponding to each pixel P.

The pixel data can represent a grayscale value for each pixel P. The data driving device 110 can generate a data voltage VD corresponding to the grayscale value.

The pixel data can be stored in the latch circuit of the data driving device 110 and can be output as a digital signal. The data driving device 110 can convert a digital signal into an analog voltage using reference gamma voltages.

There is a difference between the gradation corresponding to physical brightness and the gradation corresponding to the brightness perceived by humans. Correcting this difference is called gamma conversion. When converting a digital signal to an analog voltage, the data driving device 110 can also apply gamma conversion at the same time. For example, the data driving device 110 can simultaneously apply digital-to-analog conversion and gamma conversion by using analog voltages used for digital-to-analog conversion as voltages to which gamma conversion has been applied—reference gamma voltages.

The analog voltage may not be suitable for driving the pixel P due to its low power level. Therefore, the data driving device 110 can amplify the analog voltage to generate the data voltage VD, and supply the data voltage VD with a relatively high power level to the pixel P.

Figure 2:
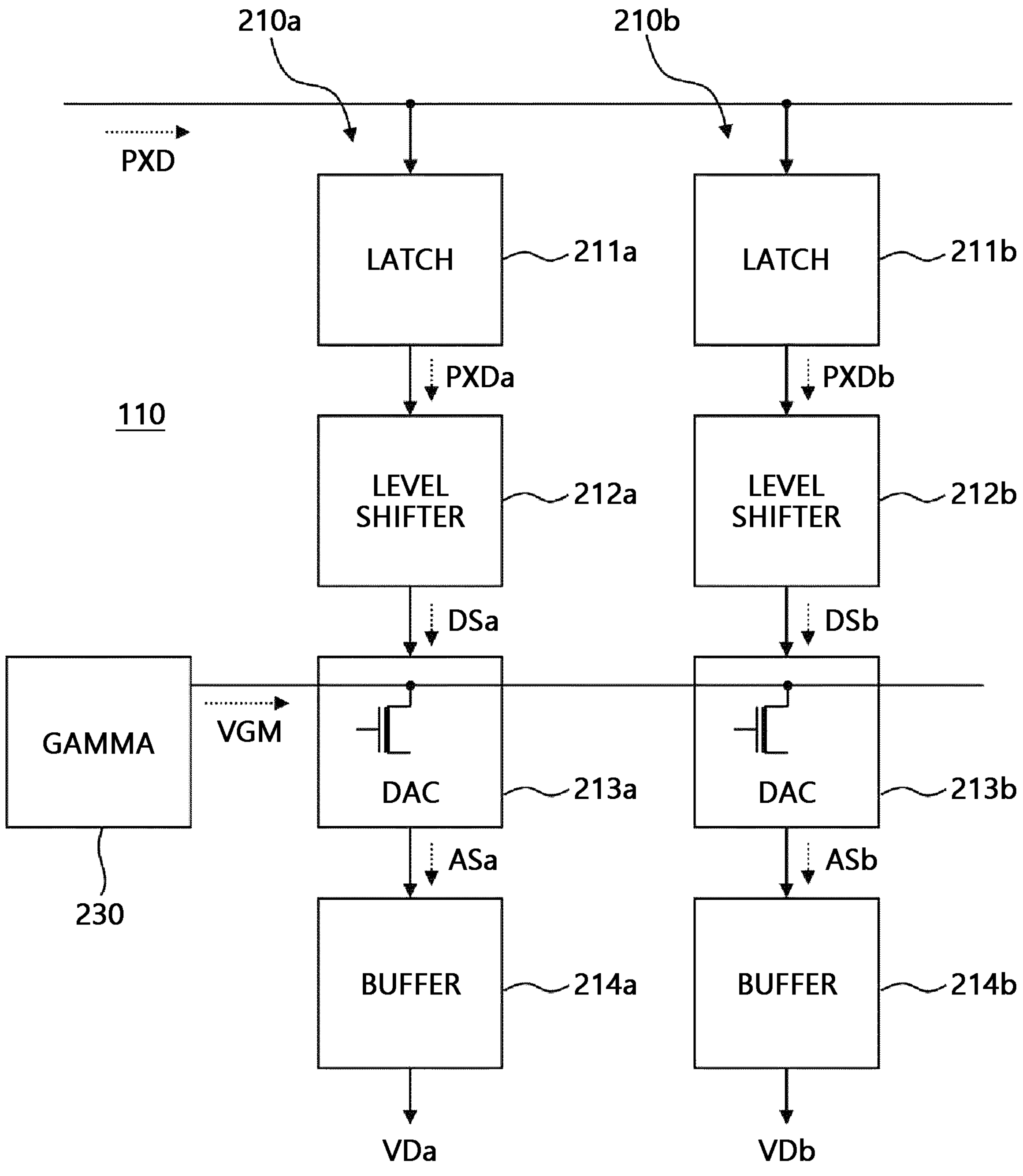
FIG. 2 is a configuration diagram of a data driving device according to an embodiment.

FIG. 2 is a configuration diagram of a data driving device according to an embodiment.

Referring to FIGS. 1 and 2, the data driving device 110 can comprise a first channel circuit 210*a*, a second channel circuit 210*b*, and a reference gamma voltage generation circuit 230.

The first channel circuit 210*a* can comprise a first latch circuit 211*a*, a first level shifter 212*a*, a first DAC 213*a*, and a first buffer 214*a*. The first channel circuit 210*a* can receive a first pixel data PXDa corresponding to the grayscale value of the first pixel, generate a first data voltage VDa, and supply the first data voltage VDa to the first data line connected to the first pixel.

The second channel circuit 210*b* can comprise a second latch circuit 211*b*, a second level shifter 212*b*, a second DAC 213*b*, and a first buffer 214*b*. The second channel circuit 210*b* can receives the second pixel data PXDb corresponding to the grayscale value of the second pixel, generate a second data voltage VD, and supply the second data voltage VD to the second data line connected to the second pixel.

The first latch circuit 211*a* and the second latch circuit 211*b* can sequentially store pixel data PXD received through a data bus line.

The first latch circuit 211*a* and the second latch circuit 211*b* can each comprise two latches therein, that is, a first latch and a second latch, but is not limited thereto. The first latch can store pixel data to be output at the next horizontal time, that is, the second horizontal time, and the second latch can store pixel data to be output at the current horizontal time, that is, the first horizontal time. When the second horizontal time comes, pixel data to be output at the next horizontal time, that is, the third horizontal time, can be stored in the first latch, and the pixel data stored in the first latch can be moved to the second latch and stored.

The output timing of each of the first latch circuit 211*a* and the second latch circuit 211*b* can be determined according to the latch output signal generated at each horizontal time. The latch output signal can be synchronized with the horizontal synchronization signal. Alternatively, the latch output signal can be a signal that has a different phase from the horizontal synchronization signal but has the same cycle length.

The first latch circuit 211*a* can transfer the first pixel data PXDa stored in the first latch circuit 211*a* to the first level shifter 212*a* according to the latch output signal.

The second latch circuit 211*b* can transfer the second pixel data PXDb stored in the second latch circuit 211*b* to the second level shifter 212*b* according to the latch output signal.

The first level shifter 212*a* can convert the first pixel data PXDa into a first digital signal DSa, and the second level shifter 212*b* can convert the second pixel data PXDb into a second digital signal DSb.

The first pixel data PXDa and the second pixel data PXDb can be signals with a low voltage or power level. The first level shifter 212*a* can convert the first pixel data PXDa into a first digital signal DSa with a high voltage or power level. The second level shifter 212*b* can convert the second pixel data PXDb into a second digital signal DSb with a high voltage or power level.

The first DAC 213*a* can receive the first digital signal DSa and drive the gate terminals of the first switches therein. The first DAC 213*a* can convert the first digital signal DSa into the first analog voltage ASa by driving the gate terminals of the first switches.

The second DAC 213*b* can receive the second digital signal DSb and drive the gate terminals of the second switches therein. The second DAC 213*b* can convert the second digital signal DSb into the second analog voltage ASb by driving the gate terminals of the second switches.

The first DAC 213*a* can comprise a plurality of first switches. The first switches can selectively connect one of a plurality of reference gamma voltage lines to which a plurality of reference gamma voltages are supplied to the output terminal according to on the on-off state. The output terminal can be connected to the first buffer 214*a*. The voltage formed on one selected reference gamma voltage line can be the first analog voltage ASa. The first digital signal DSa can change the on-off state of the first switches while being supplied to the gate terminals of the first switches. At this time, the gate load can increase at the switch whose state is changed. For example, the gate load may increase in a switch that changes from an on state to an off state or a switch that changes from an off state to an on state.

The second DAC 213*b* can comprise a plurality of second switches. The second switches can selectively connect one of a plurality of reference gamma voltage lines to which a plurality of reference gamma voltages are supplied to the output terminal according to the on-off state. The output terminal can be connected to the second buffer 214*b*. The voltage formed on one selected reference gamma voltage line can be the second analog voltage ASb. The second digital signal DSb can change the on-off state of the second switches while being supplied to the gate terminals of the second switches. At this time, the gate load can increase at the switch whose state is changed. For example, the gate load can increase in a switch that changes from an on state to an off state or a switch that changes from an off state to an on state.

The first digital signal DSa can be supplied to drive the gate terminals of the first switches, and the second digital signal DSb can be supplied to drive the gate terminals of the second switches. The first digital signal DSa can be output by the first level shifter 212*a* and the second digital signal DSb can be output by the second level shifter 212*b*. From this perspective, the gate load of the first switches of the first DAC 213*a* can become part of the output load of the first level shifter 212*a*, and the gate load of the second switches of the second DAC 213*b* can become a part of the output load of the second level shifter 212*b*.

The first DAC 213*a* and the second DAC 213*b* can have different gate loads for the first digital signal DSa and the second digital signal DSb having the same grayscale value. For example, when the grayscale value is in the range of 0 to 255, the grayscale value indicated by the first digital signal DSa is 0, and the grayscale value indicated by the second digital signal DSb is 0, the gate load of the first DAC 213*a* and the gate load of the second DAC 213*b* can be different.

From the perspective of the first level shifter 212*a* and the second level shifter 212*b*, the output loads of the first level shifter 212*a* and the second level shifter 212*b* can be different for the same grayscale value.

When the gate load is proportional to the number of switches that change the state, the first DAC 213*a* and the second DAC 213*b* can have different numbers of switches that are turned on for the first digital signal DSa and the second digital signal DSb having the same grayscale value. Alternatively, the first DAC 213*a* and the second DAC 213*b* can have different numbers of switches that are turned off for the first digital signal DSa and the second digital signal DSb having the same grayscale value.

The arrangement structure of the first switches in the first DAC 213*a* and the arrangement structure of the second switches in the second DAC 213*b* can be different. Alternatively, the structures in which the first switches and the second switches are connected to the plurality of reference gamma voltage lines can be different. At this time, the number of first switches of the first DAC 213*a* and the number of second switches of the second DAC 213*b* can be the same.

Meanwhile, depending on the grayscale value, the sum of the number of switches that are turned on among the first switches and the number of switches that are turned on among the second switches can be constant. Accordingly, depending on the grayscale value, the sum of the gate loads of the first DAC 213*a* and the second DAC 213*b* can be substantially the same.

The first grayscale value can be the lowest grayscale value, for example, 0, and the second grayscale value can be the highest grayscale value, for example, 255.

The average gate load of the first DAC 213*a* and the second DAC 213*b* for the entire grayscale value range—for example, 0 to 255—can be the same. From another perspective, the average number of turn-on switches or the average number of turn-off switches of the first DAC 213*a* and the second DAC 213*b* can be the same in the entire grayscale value range.

In the entire grayscale value range, the sum of the gate loads of the first DAC 213*a* and the second DAC 213*b* can be substantially the same. For example, when defining the grayscale value obtained by subtracting the first grayscale value from the highest grayscale value as the second grayscale value, the gate load that combines the gate load of the first DAC 213*a* for the first grayscale value and the gate load of the second DAC for the second grayscale value may be substantially the same over the entire grayscale value range.

The second DAC 213*b* can have an inverted structure from that of the first DAC 213*a*. Through this, as described above, it is possible to have different gate loads for the same grayscale value and make the sum of the gate loads substantially the same over the entire grayscale value range.

The first DAC 213*a* and the second DAC 213*b* each have a plurality of first switches and a plurality of second switches connecting one of the plurality of reference gamma voltage lines to which the plurality of reference gamma voltages are supplied to the output terminal. Here, the connection relationship between the plurality of reference gamma voltage lines and the first switches can be different from the connection relationship between the plurality of reference gamma voltage lines and the second switches.

The second digital signal DSb can have the form of an inverted signal with respect to the first digital signal DSa. Through this, as described above, it is possible to have different gate loads for the same grayscale value and make the sum of the gate loads substantially the same over the entire grayscale value range.

The first channel circuit 210*a* and the second channel circuit 210*b* can comprise buffers 214*a* and 214*b* disposed between the output terminals of the DACs 213*a* and 213*b* and the pixel, respectively.

The first buffer 214*a* can amplify the output of the first DAC 213*a* and supply it to the first data line connected to the first pixel. For example, the first buffer 214*a* can amplify the first analog voltage ASa to generate the first data voltage VDa and supply the first data voltage VDa to the first data line.

The second buffer 214*b* can amplify the output of the second DAC 213*b* and supply it to the second data line connected to the second pixel. For example, the second buffer 214*b* can amplify the second analog voltage ASb to generate the second data voltage VDb and supply the second data voltage VDb to the second data line.

The first data line to which the first channel circuit 210*a* supplies the first data voltage VDa and the second data line to which the second channel circuit 210*b* supplies the second data voltage VDb can be disposed adjacent to each other in the display panel. Two adjacent pixels, that is, the first pixel and the second pixel, are likely to have the same or similar grayscale values. According to the above-described embodiment, the sum of the gate loads of the DACs 213*a* and 213*b* of the first channel circuit 210*a* and the second channel circuit 210*b* that drive two adjacent pixels does not have large fluctuations in the entire grayscale value range. Therefore, it is possible to reduce the peak current and minimize the generation of electromagnetic waves or noise due to instantaneous current fluctuations.

The data driving device 110 according to the embodiment can comprise a plurality of first channel circuits 210*a* and a plurality of second channel circuits 210*b*. The plurality of first channel circuits 210*a* and the plurality of second channel circuits 210*b* can be disposed alternately in one direction. For example, in one direction, the plurality of first channel circuits 210*a* can be arranged in odd numbers, and the plurality of second channel circuits 210*b* can be arranged in even numbers.

The data driving device 110 can comprise a reference gamma voltage generation circuit 230 that supplies reference gamma voltages VGM to the first DAC 213*a* and the second DAC 213*b*.

Figure 3:
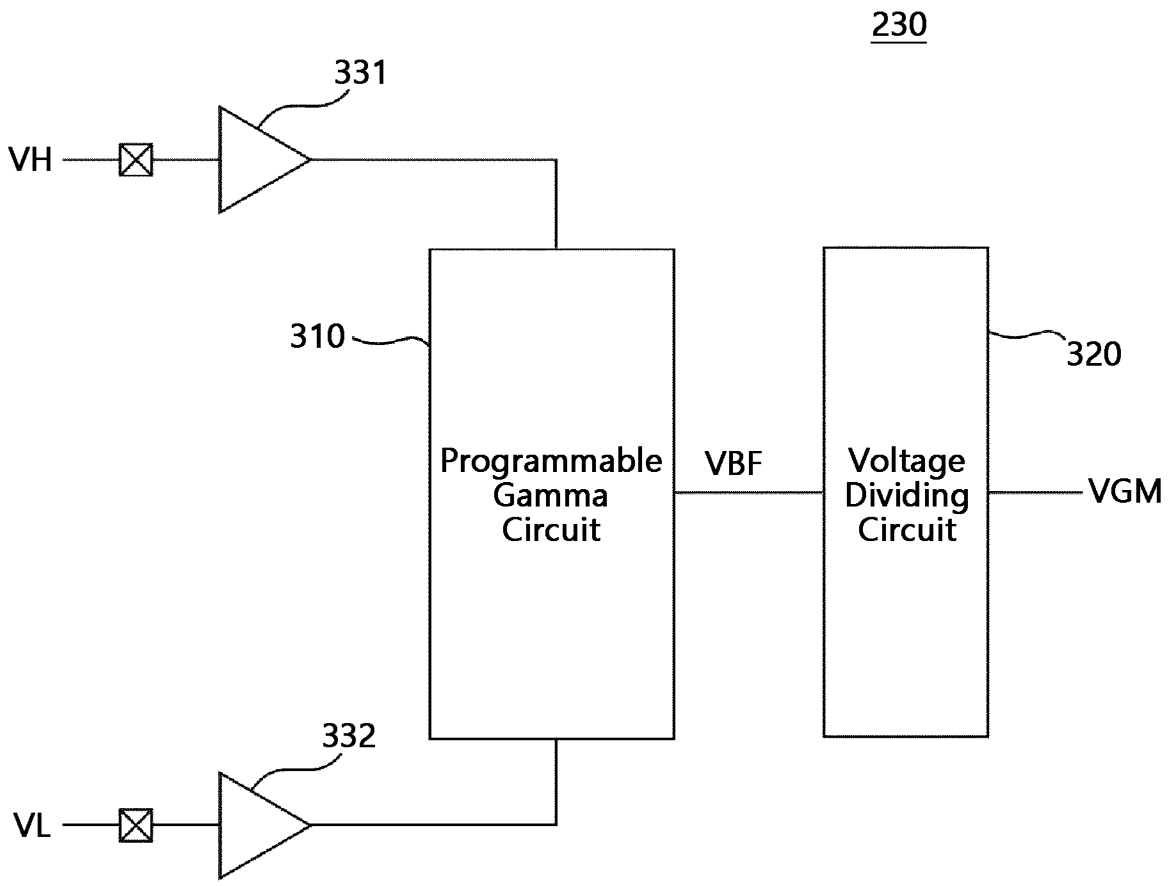
FIG. 3 is a configuration diagram of a reference gamma voltage generation circuit according to an embodiment.

FIG. 3 is a configuration diagram of a reference gamma voltage generation circuit according to an embodiment.

Referring to FIG. 3, the reference gamma voltage generation circuit 230 can divide the voltage between the first gamma driving voltage VH and the second gamma driving voltage VL to generate a plurality of reference gamma voltages VGM. The first gamma driving voltage VH can be greater than the second gamma driving voltage VL. The reference gamma voltage generation circuit 230 can comprise a programmable gamma circuit 310, a voltage dividing circuit 320, etc.

The reference gamma voltage generation circuit 230 can comprise a first reference gamma voltage buffer 331 for buffering or amplifying the first gamma driving voltage VH and a second reference gamma voltage buffer 332 for buffering or amplifying the second gamma driving voltage VL.

The programmable gamma circuit 310 can receive the first gamma driving voltage VH and the second gamma driving voltage VL to generate a plurality of buffer voltages VBF, and supply the buffer voltages VBF to the voltage dividing circuit 320.

The programmable gamma circuit 310 can adjust the level of the buffer voltages VBF according to the level adjustment signal. The level adjustment signal can be generated in the data processing device 130, but this is not limited.

The voltage dividing circuit 320 can comprise resistance string. A plurality of nodes can be formed in the resistance string. The buffer voltages VBF transmitted from the programmable gamma circuit 310 can be supplied to some nodes among the plurality of nodes. The voltage dividing circuit 320 can generate voltages having different levels at a plurality of nodes using buffer voltages VBF, and output the voltages generated at the plurality of nodes as a plurality of reference gamma voltages VGM.

Figure 4:
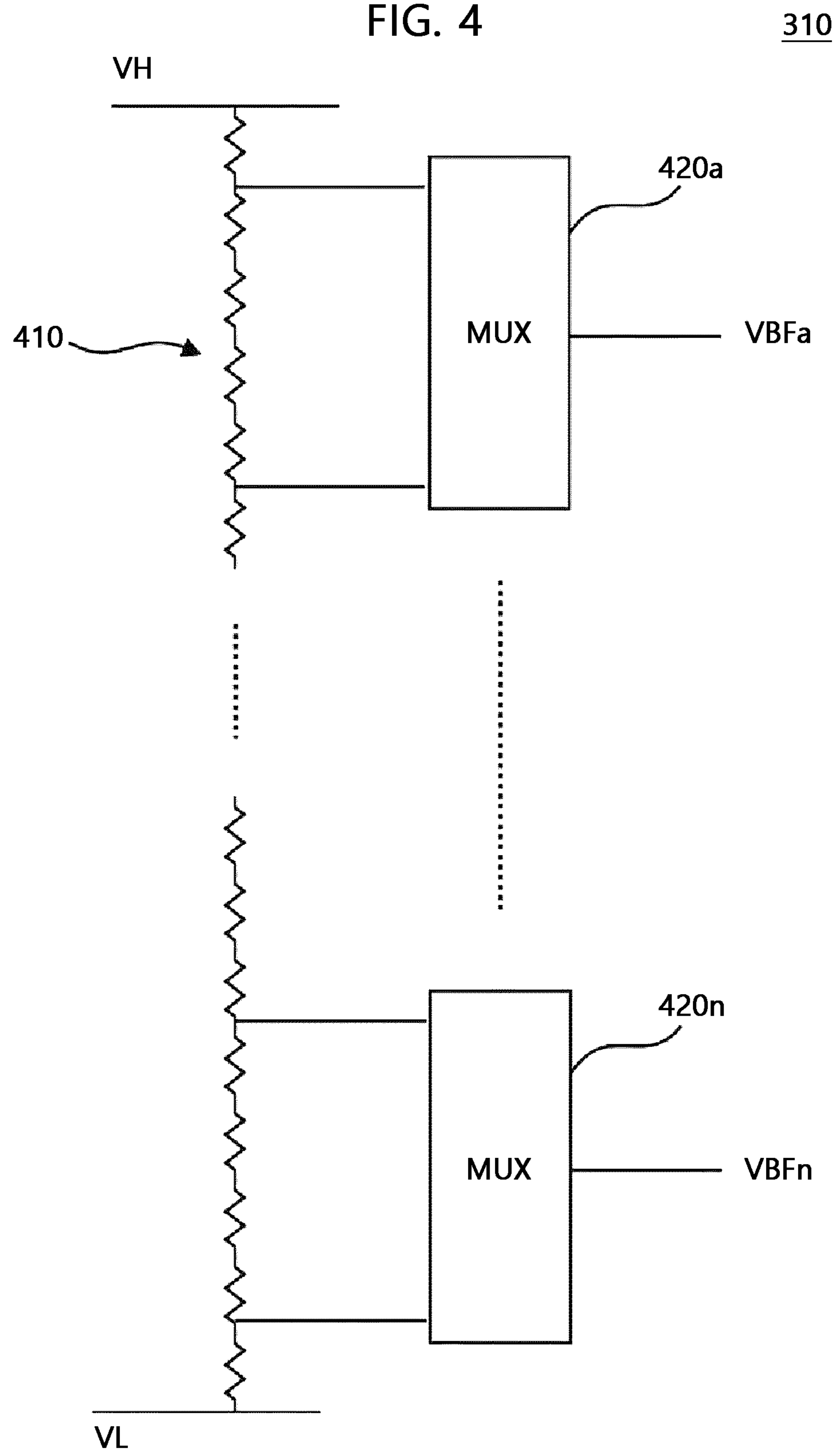
FIG. 4 is a configuration diagram of a programmable gamma circuit according to an embodiment.

FIG. 4 is a configuration diagram of a programmable gamma circuit according to an embodiment.

Referring to FIG. 4, the programmable gamma circuit 310 can comprise a first resistance string 410 whose one end is connected to the first gamma driving voltage VH and the other end is connected to the second gamma driving voltage VL.

A plurality of first nodes can be formed in the first resistance string 410. The plurality of first nodes can be divided into a plurality of groups.

The programmable gamma circuit 310 can comprise a plurality of multiplexers 420*a* to 420*n*.

A plurality of multiplexers 420*a* to 420*n* can be connected to the plurality of first nodes formed in the first resistance string 410. The plurality of first nodes comprised in one group can be connected to one multiplexer.

Each multiplexer 420*a* to 420*n* can output a voltage of one node among the plurality of first nodes belonging to each group according to the level adjustment signal.

In this way, the programmable gamma circuit 310 can generate N buffer voltages VBFa to VBFn whose levels can be adjusted (N is a natural number).

Figure 5:
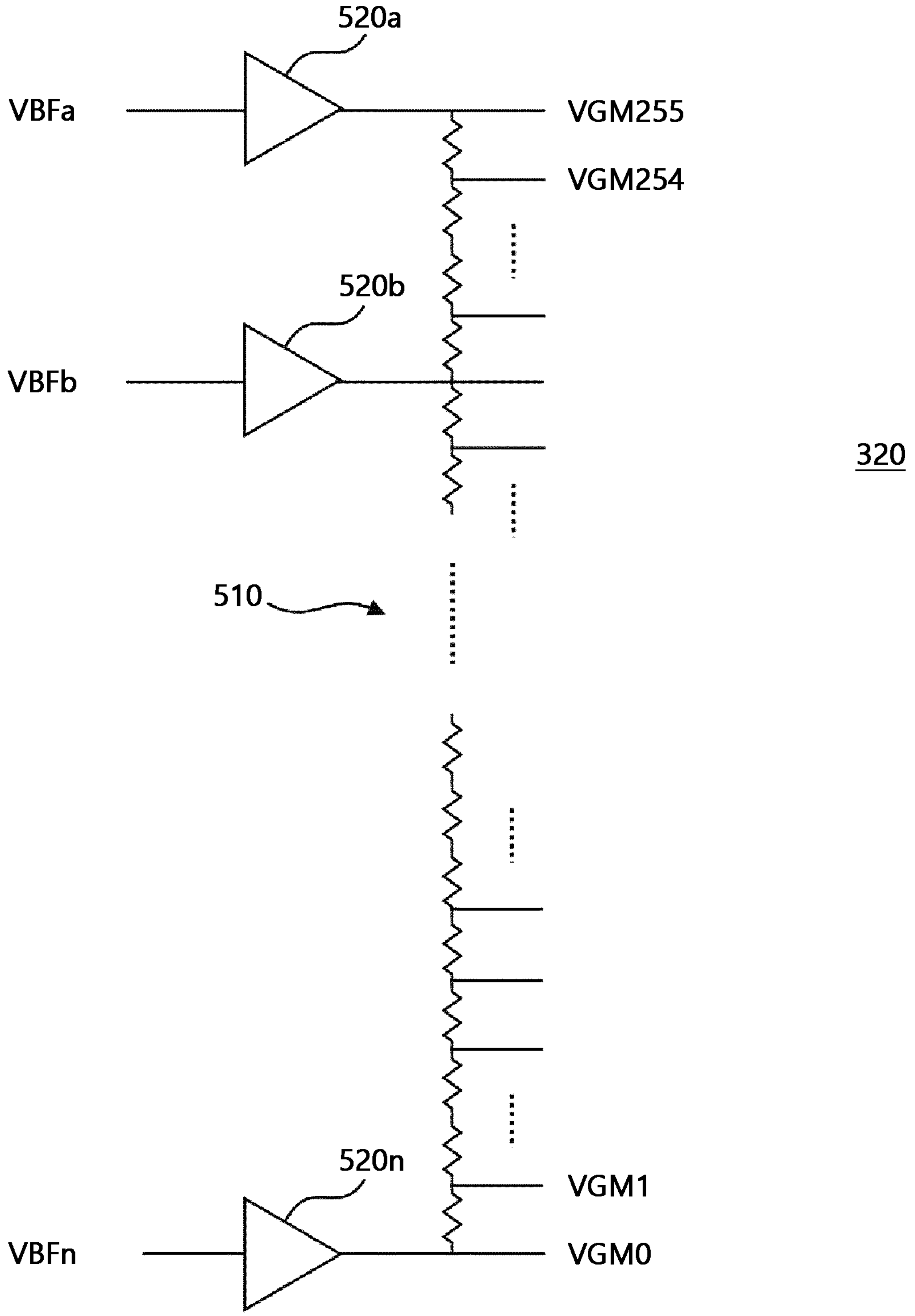
FIG. 5 is a configuration diagram of a voltage dividing circuit according to an embodiment.

FIG. 5 is a configuration diagram of a voltage dividing circuit according to an embodiment.

Referring to FIG. 5, the voltage dividing circuit 320 can comprise a plurality of buffers 520*a* to 520*n* for buffering or amplifying the buffer voltages VBFa to VBFn. The voltage dividing circuit 320 can comprise a second resistance string 510 in which a plurality of nodes are formed.

The buffer voltages VBFa to VBFn can be supplied to at least one node among a plurality of nodes through the buffers 520*a* to 520*n*. Voltages of different levels can be generated in a plurality of nodes by these buffer voltages VBFa to VBFn.

The voltage dividing circuit 320 can output voltages formed at a plurality of nodes as reference gamma voltages VGM0 to VGM255.

The first DAC and the second DAC according to the embodiment can convert the digital signal corresponding to the grayscale value into an analog voltage using these reference gamma voltages VGM0 to VGM255.

Figure 6:
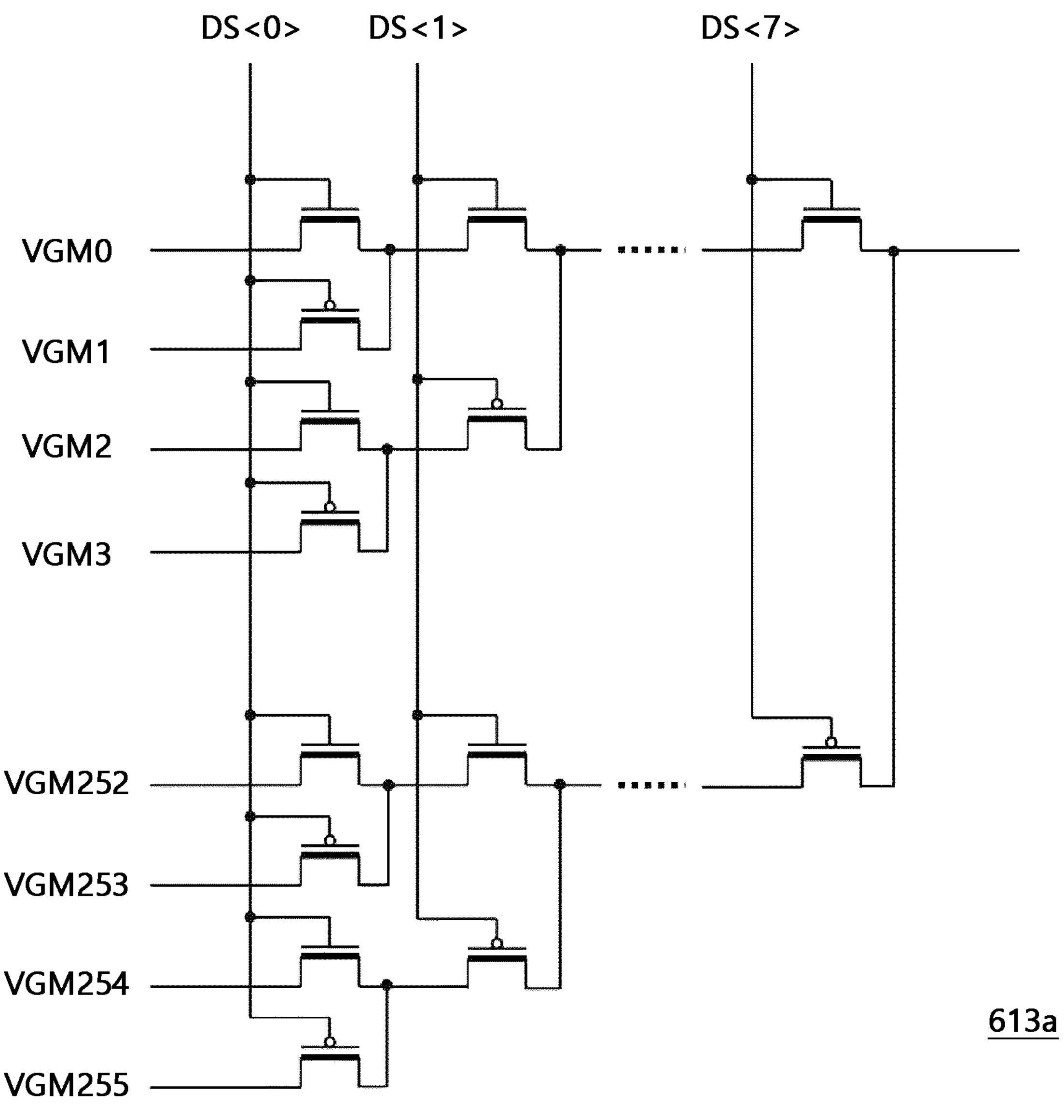
FIG. 6 is a first example configuration diagram of a first DAC according to an embodiment.
Figure 7:
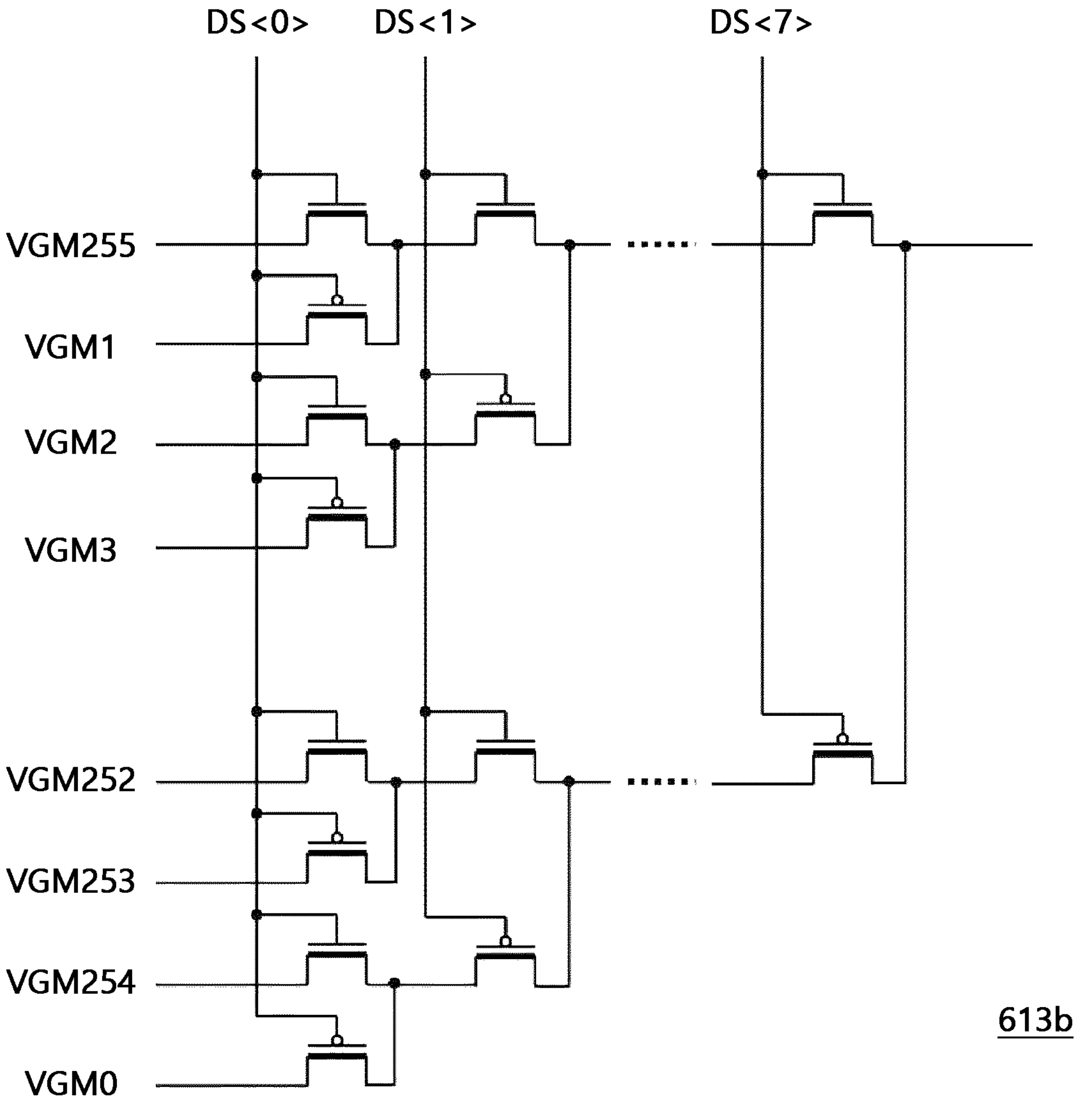
FIG. 7 is a second example configuration diagram of a second DAC according to an embodiment.

FIG. 6 is a first example configuration diagram of a first DAC according to an embodiment, and FIG. 7 is a second example configuration diagram of a second DAC according to an embodiment.

Referring to FIGS. 6 and 7, the first DAC 613*a* and the second DAC 613*b* can each comprise a plurality of switches.

The plurality of switches can selectively connect one of the plurality of reference gamma voltage lines supplied with the plurality of reference gamma voltages VGM0 to VGM255 to the output terminal.

The first switches arranged in the first DAC 613*a* and the second switches arranged in the second DAC 613*b* can have different arrangement structures or different connection relationships with the reference gamma voltage lines. Through this, the first DAC 613*a* and the second DAC 613*b* can have different gate loads for the same grayscale value, and can have the same gate load for different grayscale values.

For example, in FIGS. 6 and 7, a signal for the first bit (DS<0>) of the digital signal can be supplied to the gate terminal of the lowest switch, and a signal for the second bit (DS<1>) of the digital signal can be supplied to the gate terminal of the top switches. In this way, a signal for the 7th bit (DS<7>) of the digital signal can be supplied to the gate terminal of the uppermost switch. A plurality of reference gamma voltages VGM0 to VGM255 can be connected to the lowest switch. In this case, the reference gamma voltage line supplied with the lowest reference gamma voltage VGM0 and the reference gamma voltage line supplied with the highest reference gamma voltage VGM255 can be oppositely connected to each other at the lowest switch in the first DAC 613*a* and the second DAC 613*b*. For example, as shown in FIG. 6, in the first DAC 613*a*, the reference gamma voltage line to which the highest reference gamma voltage VGM255 is supplied can be connected to the lowest switch, and the reference gamma voltage line to which the lowest reference gamma voltage VGM0 is supplied can be connected to the uppermost switch. On the contrary, as shown in FIG. 7, in the second DAC 613*b*, the reference gamma voltage line to which the highest reference gamma voltage VGM255 is supplied can be connected to the uppermost switch, and the reference gamma voltage line to which the lowest reference gamma voltage VGM0 is supplied can be connected to the lowest switch.

Through this, the gate load of the first DAC 613*a* and the second DAC 613*b* can be different for the same lowest grayscale value. Additionally, the gate loads of the first DAC 613*a* and the second DAC 613*b* can be the same for different grayscale values—for example, the lowest grayscale value and the highest grayscale value.

Figure 8:
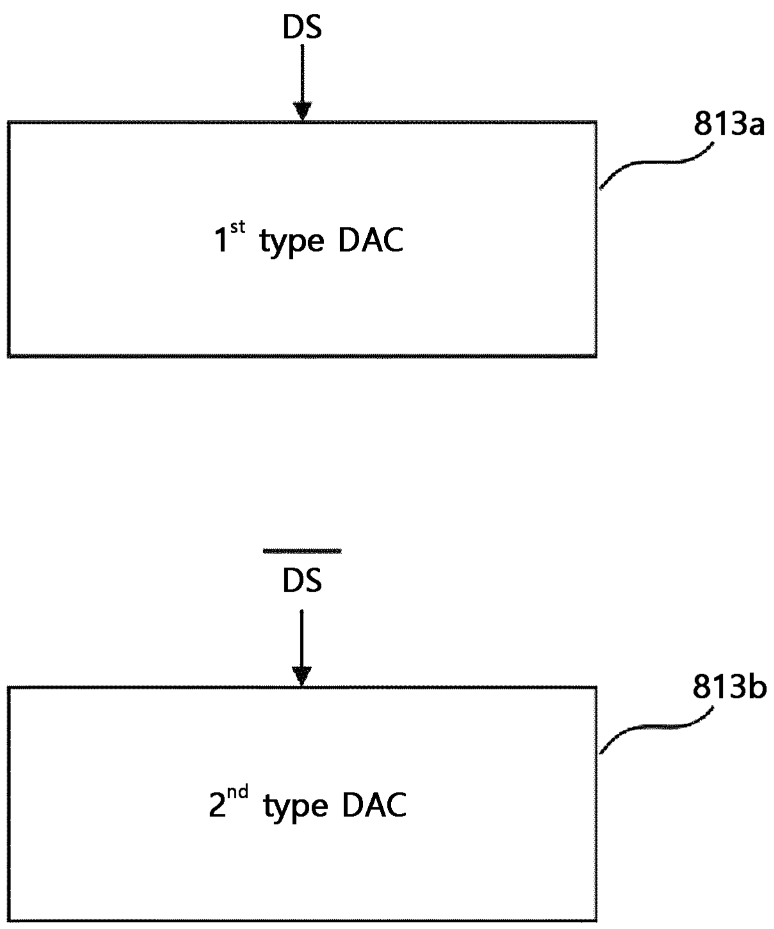
FIG. 8 is a diagram showing a second example of a first DAC and a second DAC according to an embodiment.

FIG. 8 is a diagram showing a second example of a first DAC and a second DAC according to an embodiment.

Referring to FIG. 8, when the first digital signal DS is supplied to the first DAC 813*a*, the second digital signal DS (bar) having a phase inverted from the first digital signal DScan be supplied to the second DAC 813*b*.

For the same grayscale value, the first DAC 813*a* and the second DAC 813*b* can generate the same analog voltage. However, unlike the first DAC 813*a*, the second DAC 813*b* can drive the second switches according to the digital signal of the inverted phase, so that the gate load of the first DAC 813*a* and the second DAC 813*b* can be different for the same grayscale value.

Figure 9:
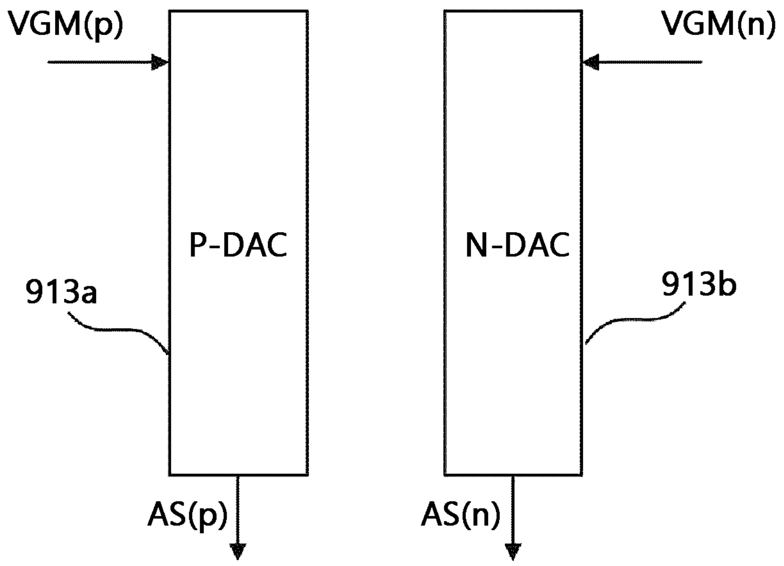
FIG. 9 is a diagram showing a third example of a first DAC and a second DAC according to an embodiment.

FIG. 9 is a diagram showing a third example of a first DAC and a second DAC according to an embodiment.

Referring to FIG. 9, the first DAC 913*a* can have the form of a P-DAC, and the second DAC 913*b* can have the form of an N-DAC.

The P-DAC 913*a* can convert a digital signal for driving a pixel into an analog voltage AS(p) with positive polarity. The P-DAC 913*a* can be supplied with first reference gamma voltages VGM(p) having positive polarity. The P-DAC 913*a* can selectively output one of the first reference gamma voltages VGM(p) as an analog voltage AS(p) having a positive polarity according to the input digital signal.

The N-DAC 913*b* can convert a digital signal for driving a pixel into an analog voltage AS(n) with negative polarity. The N-DAC 913*b* can be supplied with second reference gamma voltages VGM(n) having negative polarity. The N-DAC 913*b* can selectively output one of the second reference gamma voltages VGM(n) as an analog voltage AS(n) having a negative polarity according to the input digital signal.

The P-DAC 913*a* and N-DAC 913*b* can have different gate loads for the first and second digital signals having the same grayscale value. For example, the P-DAC 913*a* and N-DAC 913*b* can have different gate loads for the same lowest grayscale value. Additionally, the P-DAC 913*a* and N-DAC 913*b* can have different gate loads can be present for the same highest grayscale value.

The P-DAC 913*a* and N-DAC 913*b* can have gate loads of the same size for different grayscale values. For example, the gate load of the P-DAC 913*a* for the lowest grayscale value and the gate load of the N-DAC 913*b* for the highest grayscale value can be the same. Additionally, the gate load of the P-DAC 913*a* for the highest grayscale value and the gate load of the N-DAC 913*b* for the lowest grayscale value can be the same. The sum of the gate load of the P-DAC for the lowest grayscale value and the gate load of the N-DAC for the highest grayscale value can be the same according to a grayscale value.

The data driving device can comprise a plurality of P-DACs 913*a* and a plurality of N-DACs 913*b*. The P-DACs 913*a* and N-DACs 913*b* can be disposed alternately in one direction. The display panel driven by this data driving device can be a liquid crystal display panel.

Figure 10:
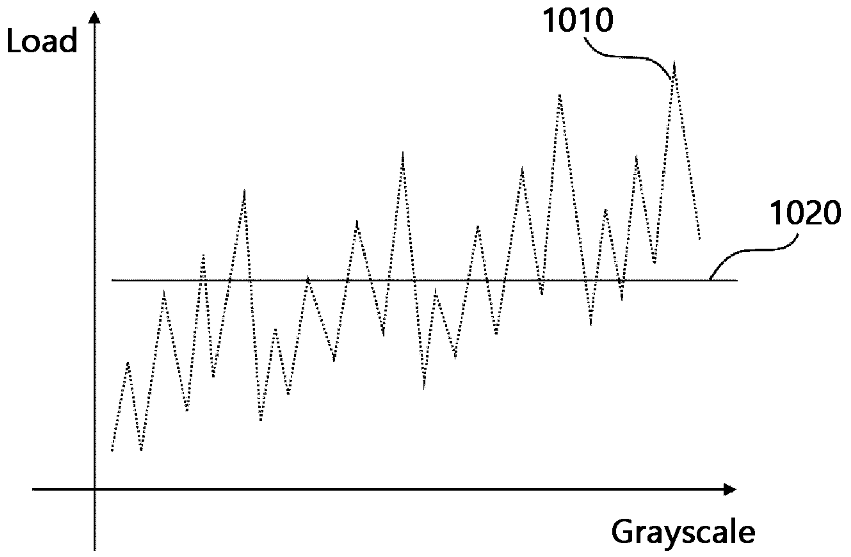
FIG. 10 is a graph showing the gate load of a DAC of related technology and the gate load of a DAC according to an embodiment.

FIG. 10 is a graph showing the gate load of a DAC of related technology and the gate load of a DAC according to an embodiment.

FIG. 10 shows the gate load when one scan line is driven with the same grayscale value.

Referring to FIG. 10, the DAC of related technology had a gate load 1010 that varied greatly depending on the grayscale value. For example, if one scan line has the lowest grayscale value (e.g., the grayscale value corresponding to black) and the next scan line has the highest grayscale value (e.g., the grayscale value corresponding to white), the gate load 1010 of the DAC fluctuated greatly.

On the other hand, the gate load 1020 of the DAC according to the embodiment can maintain a constant level in the entire grayscale value range regardless of the change in the grayscale value.

According to the embodiment, the peak current of DACs can be reduced and the current fluctuations in DACs can be alleviated. According to the embodiment, the image quality of the display panel can be improved by minimizing the generation of electromagnetic waves or noise caused by DACs.

What is claimed is:

1. A data driving device, comprising:

a first channel circuit comprising a first digital to analog converter (DAC) configured to perform digital-to-analog conversion using a plurality of first switches, and configured to drive a first pixel with a first data voltage that amplifies an output of the first DAC; and a second channel circuit configured to perform digital-analog conversion using a plurality of second switches and drive a second pixel with a second data voltage that amplifies an output of a second DAC, wherein in the second DAC, the plurality of second switches are disposed so that the number of the plurality of second switches turned on for one digital signal corresponding to one grayscale value is different from the number of the plurality of first switches turned on in the first DAC.

2. The data driving device of claim 1, wherein the first channel circuit comprises a first level shifter that converts first pixel data corresponding to a grayscale value of the first pixel into a first digital signal for driving gates of the plurality of first switches, the second channel circuit comprises a second level shifter that converts second pixel data corresponding to a grayscale value of the second pixel into a second digital signal for driving gates of the plurality of second switches, and output loads of the first level shifter and the second level shifter for the one grayscale value are different from each other.

3. The data driving device of claim 1, wherein the sum of the number of switches turned on among the plurality of first switches and the number of switches turned on among the plurality of second switches is constant according to the one grayscale value.

4. The data driving device of claim 3, wherein the grayscale value of the first pixel is a lowest grayscale value, and the grayscale value of the second pixel is a highest grayscale value.

5. The data driving device of claim 1, wherein the first DAC and the second DAC are configured to selectively connect one of a plurality of reference gamma voltage lines to which a plurality of reference gamma voltages are supplied to an output terminal using the plurality of first switches and the plurality of second switches, respectively.

6. The data driving device of claim 5, comprising:

a reference gamma voltage generation circuit configured to divide a voltage between a first gamma driving voltage and a second gamma driving voltage to generate the plurality of reference gamma voltages.

7. The data driving device of claim 6, wherein the reference gamma voltage generation circuit is configured to output voltages formed at a plurality of nodes of a resistance string as the plurality of reference gamma voltages, and adjust a voltage of at least one node among the plurality of nodes according to external level adjustment signal.

8. The data driving device of claim 1, wherein the first channel circuit and the second channel circuit each comprise a buffer between the corresponding output terminal of the DAC and the pixel.

9. A data driving device, comprising:

a first digital to analog converter (DAC) and a second DAC having different gate loads for first and second digital signals having the same grayscale value;

a first buffer configured to amplify an output of the first DAC and supplies the amplified output to a first data line connected to a first pixel; and a second buffer configured to amplify an output of the second DAC and supplies the amplified output to a second data line connected to a second pixel, wherein the first DAC and the second DAC each comprise a plurality of first switches and a plurality of second switches connecting one of a plurality of reference gamma voltage lines to which a plurality of reference gamma voltages are supplied to an output terminal, respectively, and a connection relationship between the plurality of reference gamma voltage lines and a first switch is different from the connection relationship between the plurality of reference gamma voltage lines and a second switch.

10. The data driving device of claim 9, wherein a sum of the gate load of the first DAC for a lowest grayscale value and the gate load of the second DAC for a highest grayscale value is the same.

11. The data driving device of claim 9, wherein an average gate load of the first DAC and the second DAC for an entire grayscale value range is the same.

12. The data driving device of claim 9, wherein when defining a grayscale value obtained by subtracting a first grayscale value from a highest grayscale value as a second grayscale value, a gate load that combines a gate load of the first DAC for the first grayscale value and a gate load of the second DAC for the second grayscale value is substantially the same over an entire grayscale value range.

13. The data driving device of claim 9, wherein the second DAC has an inverted structure from the first DAC.

14. The data driving device of claim 9, wherein the second digital signal has the form of an inverted signal with respect to the first digital signal.

15. A data driving device, comprising:

a positive digital to analog converter (P-DAC) configured to convert digital signals for driving pixels into analog voltages with positive polarity; and a negative DAC (N-DAC) configured to convert the digital signals for driving the pixels into analog voltages with negative polarity, wherein the P-DAC and the N-DAC have different gate loads for a first digital signal and a second digital signal having the same grayscale value, and wherein the data driving device comprises a plurality of the P-DAC and a plurality of the N-DAC, and the plurality of P-DACs and the plurality of N-DACs are disposed alternately in one direction.

16. The data driving device of claim 15, wherein first gamma reference voltages having positive polarity are supplied to the P-DAC, and the P-DAC is configured to selectively output one of the first gamma reference voltages according to an input digital signal, and second gamma reference voltages having negative polarity are supplied to the N-DAC, and the N-DAC is configured to selectively output one of the second gamma reference voltages according to the input digital signal.

17. The data driving device of claim 15, wherein the P-DAC and the N-DAC have different gate loads for a lowest grayscale value and a highest grayscale value.

18. The data driving device of claim 15, wherein a sum of the gate load of the P-DAC for a lowest grayscale value and the gate load of the N-DAC for a highest grayscale value is the same.

* * * * *